(12) United States Patent
Stein et al.

(10) Patent No.: US 8,798,392 B2
(45) Date of Patent: Aug. 5, 2014

(54) METHOD AND SYSTEM FOR GENERATING INTRINSIC IMAGES USING A SMOOTH ILLUMINATION CONSTRAINT

(75) Inventors: Andrew Neil Stein, Pittsburgh, PA (US); Casey Arthur Smith, Grand Junction, CO (US)

(73) Assignee: Tandent Vision Science, Inc., San Francisco, CA (US)

( * ) Notice: Subject to any disclaimer, the term of this patent is extended or adjusted under 35 U.S.C. 154(b) by 421 days.

(21) Appl. No.: 12/927,245

(22) Filed: Nov. 10, 2010

(65) Prior Publication Data

US 2012/0114263 A1 May 10, 2012

(51) Int. Cl.
G06K 9/40 (2006.01)

(52) U.S. Cl.
USPC ........... 382/274; 382/199; 382/201; 382/202; 382/260; 382/275

(58) Field of Classification Search
USPC ................................. 382/260, 274
See application file for complete search history.

(56) References Cited

U.S. PATENT DOCUMENTS

| | | | | |
|---|---|---|---|---|
| 6,611,627 B1* | 8/2003 | LaRossa et al. | ............. | 382/240 |
| 8,139,850 B2* | 3/2012 | Maxwell et al. | ............. | 382/164 |
| 8,139,867 B2* | 3/2012 | Maxwell et al. | ............. | 382/199 |
| 8,249,342 B1* | 8/2012 | Friedhoff et al. | ............. | 382/167 |
| 8,260,050 B2* | 9/2012 | Stein et al. | ............. | 382/173 |
| 8,385,655 B2* | 2/2013 | Smith et al. | ............. | 382/190 |
| 8,428,352 B1* | 4/2013 | Smith | ............. | 382/167 |
| 8,483,480 B2* | 7/2013 | Smith et al. | ............. | 382/173 |
| 8,553,979 B2* | 10/2013 | Smith et al. | ............. | 382/167 |
| 8,559,714 B2* | 10/2013 | Smith | ............. | 382/167 |
| 2007/0258645 A1 | 11/2007 | Gokturk | | |
| 2009/0161992 A1 | 6/2009 | Taguchi et al. | | |
| 2009/0245651 A1* | 10/2009 | Friedhoff et al. | ............. | 382/199 |
| 2010/0061628 A1 | 3/2010 | Yamada | | |
| 2010/0142825 A1* | 6/2010 | Maxwell et al. | ............. | 382/199 |
| 2010/0142846 A1* | 6/2010 | Tolliver et al. | ............. | 382/274 |
| 2010/0157072 A1* | 6/2010 | Luo et al. | ............. | 348/208.4 |
| 2012/0114263 A1* | 5/2012 | Stein et al. | ............. | 382/260 |
| 2013/0071033 A1* | 3/2013 | Stein et al. | ............. | 382/199 |
| 2013/0129208 A1* | 5/2013 | Friedhoff et al. | ............. | 382/165 |
| 2013/0136348 A1* | 5/2013 | Smith et al. | ............. | 382/164 |
| 2013/0321419 A1* | 12/2013 | Stein | ............. | 345/426 |
| 2014/0050399 A1* | 2/2014 | Lalonde et al. | ............. | 382/168 |
| 2014/0072210 A1* | 3/2014 | Stein et al. | ............. | 382/162 |

* cited by examiner

Primary Examiner — Jayesh A Patel
Assistant Examiner — Iman K Kholdebarin
(74) Attorney, Agent, or Firm — Davidson, Davidson & Kappel, LLC; Felix L. D'Arienzo, Jr.

(57) ABSTRACT

In a first exemplary embodiment of the present invention, an automated, computerized method is provided for processing an image. According to a feature of the present invention, the method comprises the steps of providing an image file depicting an image, in a computer memory, organizing information relevant to the image according to a smooth-illumination constraint enforcing a Laplacian filter response such that $\nabla^2 f(x, y)=0$ and utilizing the smooth-illumination constraint to generate an intrinsic image from the image.

11 Claims, 8 Drawing Sheets

Pixel Array for Storing Image Data

| P(1, 1) | P(1, 2) | ··· | | ··· | P(1, M) |
| P(2, 1) | P(2, 2) | | | | ⋮ |
| P(3, 1) | P(3, 2) | | | | ⋮ |
| ⋮ | | | | | |
| ⋮ | | | | | ⋮ |
| P(N, 1) | ··· | | | ··· | P(N, M) |

Image File
⌞18

FIG. 2

Figure 4: Log Color Space Chromaticity Plane

Examples of Identifying Token Regions in an Image

Original Image

Token Regions $$\begin{bmatrix} 1 & -1 & 0 \\ 1 & 0 & -1 \\ 0 & 1 & -1 \end{bmatrix} \begin{bmatrix} i_a \\ i_b \\ i_c \end{bmatrix} = \begin{bmatrix} i_a - i_b \\ i_a - i_c \\ i_b - i_c \end{bmatrix}$$

[A]         [x]   =   [b]

METHOD AND SYSTEM FOR GENERATING INTRINSIC IMAGES USING A SMOOTH ILLUMINATION CONSTRAINT

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy of computer performance.

SUMMARY OF THE INVENTION

The present invention provides a method and system implementing image processing techniques that utilize spatio-spectral information relevant to an image, to perform an operation to accurately and correctly identify and separate illumination and material aspects of the image, to generate an intrinsic image from the image.

In a first exemplary embodiment of the present invention, an automated, computerized method is provided for processing an image. According to a feature of the present invention, the method comprises the steps of providing an image file depicting an image, in a computer memory, organizing information relevant to the image according to a smooth-illumination constraint enforcing a Laplacian filter response such that $\nabla^2 f(x, y)=0$ and utilizing the smooth-illumination constraint to generate an intrinsic image from the image.

As a feature of the first exemplary embodiment of the present invention, a computer system is provided. The computer system comprises a CPU and a memory storing an image file containing an image. The CPU is arranged and configured to execute a routine to perform the process steps of the method according to the first exemplary embodiment of the present invention. As a further feature of the first exemplary embodiment of the present invention, a computer program product, disposed on a computer readable media is provided. The product includes computer executable process steps operable to control a computer to perform the process steps of the method according to the first exemplary embodiment of the present invention.

In a second exemplary embodiment of the present invention, an automated, computerized method is provided for processing an image. According to a feature of the present invention, the method comprises the steps of providing an image file depicting an image, in an array of pixels, in a computer memory, identifying tokens in the image, as a function of the pixels, modifying the tokens to eliminate blend pixels, organizing the modified tokens according to a constraint and utilizing the constraint to generate an intrinsic image from the image.

As a feature of the second exemplary embodiment of the present invention, a computer system is provided. The computer system comprises a CPU and a memory storing an image file containing an image. The CPU is arranged and configured to execute a routine to perform the process steps of the method according to the second exemplary embodiment of the present invention. As a further feature of the second exemplary embodiment of the present invention, a computer program product, disposed on a computer readable media is provided. The product includes computer executable process steps operable to control a computer to perform the process steps of the method according to the second exemplary embodiment of the present invention.

In a third exemplary embodiment of the present invention, an automated, computerized method is provided for processing an image. According to a feature of the present invention, the method comprises the steps of providing an image file depicting an image, in a computer memory, organizing information relevant to the image according to smooth-illumination constraints, weighting the constraints based upon knowledge of depth discontinuities or occlusions and utilizing the weighted smooth-illumination constraints to generate an intrinsic image from the image.

As a feature of the third exemplary embodiment of the present invention, a computer system is provided. The computer system comprises a CPU and a memory storing an image file containing an image. The CPU is arranged and configured to execute a routine to perform the process steps of the method according to the third exemplary embodiment of the present invention. As a further feature of the third exemplary embodiment of the present invention, a computer program product, disposed on a computer readable media is provided. The product includes computer executable process steps operable to control a computer to perform the process steps of the method according to the third exemplary embodiment of the present invention.

In a fourth exemplary embodiment of the present invention, an automated, computerized method is provided for processing an image. According to a feature of the present invention, the method comprises the steps of providing an image file depicting an image, in a computer memory, organizing information relevant to the image according to smooth-illumination constraints based upon a Laplacian filter response, weighting the constraints as a function of a filter response such as, for example, the filter response: $w(x, y)=1/|\nabla^2 i(x, y)|$ and utilizing the smooth-illumination constraints to generate an intrinsic image from the image.

As a feature of the fourth exemplary embodiment of the present invention, a computer system is provided. The computer system comprises a CPU and a memory storing an image file containing an image. The CPU is arranged and configured to execute a routine to perform the process steps of the method according to the fourth exemplary embodiment of the present invention. As a further feature of the fourth exemplary embodiment of the present invention, a computer program product, disposed on a computer readable media is provided. The product includes computer executable process steps operable to control a computer to perform the process steps of the method according to the fourth exemplary embodiment of the present invention.

In a fifth exemplary embodiment of the present invention, an automated, computerized method is provided for processing an image. According to a feature of the present invention, the method comprises the steps of providing an image file depicting an image, in a computer memory, organizing information relevant to the image according to smooth-illumination constraints, detecting smooth-illumination constraint chains as a function of observable image characteristics, adjusting constraints within the detected chain to minimize unwanted color artifact effects in the generation of intrinsic images and utilizing the smooth-illumination constraints to generate an intrinsic image from the image.

As a feature of the fifth exemplary embodiment of the present invention, a computer system is provided. The computer system comprises a CPU and a memory storing an image file containing an image. The CPU is arranged and configured to execute a routine to perform the process steps of the method according to the fifth exemplary embodiment of the present invention. As a further feature of the fifth exemplary embodiment of the present invention, a computer program product, disposed on a computer readable media is provided. The product includes computer executable process steps operable to control a computer to perform the process steps of the method according to the fifth exemplary embodiment of the present invention.

In accordance with yet further embodiments of the present invention, computer systems are provided, which include one or more computers configured (e.g., programmed) to perform the methods described above. In accordance with other embodiments of the present invention, non-transitory computer readable media are provided which have stored thereon computer executable process steps operable to control a computer(s) to implement the embodiments described above. The present invention contemplates a computer readable media as any product that embodies information usable in a computer to execute the methods of the present invention, including instructions implemented as a hardware circuit, for example, as in an integrated circuit chip. The automated, computerized methods can be performed by a digital computer, analog computer, optical sensor, state machine, sequencer, integrated chip or any device or apparatus that can be designed or programmed to carry out the steps of the methods of the present invention.

BRIEF DESCRIPTION OF THE DRAWINGS

FIG. 2 shows an n×m pixel array image file for an image stored in the computer system of FIG. 1.

FIG. 6b shows Type C token regions in the image of FIG. 6a.

DETAILED DESCRIPTION OF THE PREFERRED EMBODIMENTS

Figure 1:
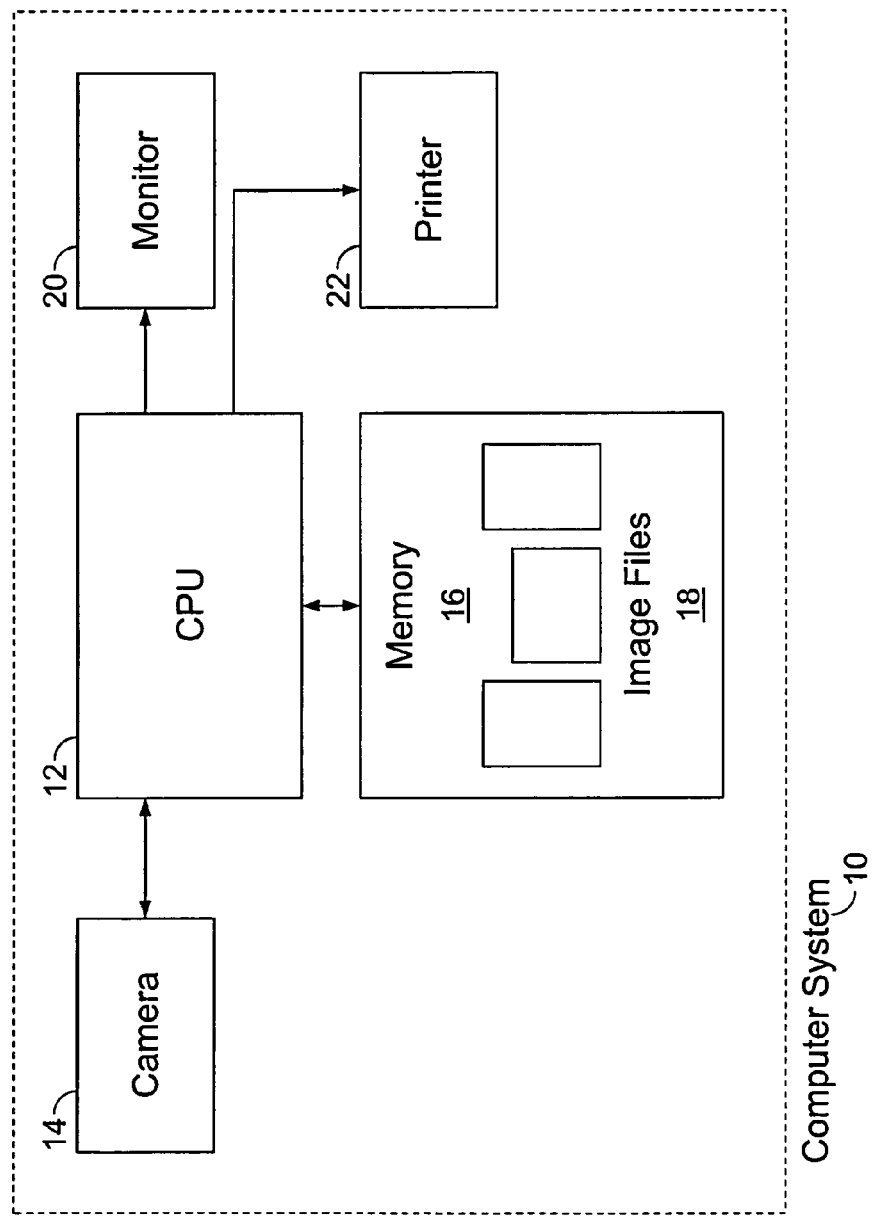
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a Monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p(1, 1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a correct and accurate identification of illumination and material aspects of the image. The present invention provides a method and system for generation of intrinsic images. The intrinsic images correspond to an original image, for example, an image depicted in an input image file 18. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects).

Figure 3:
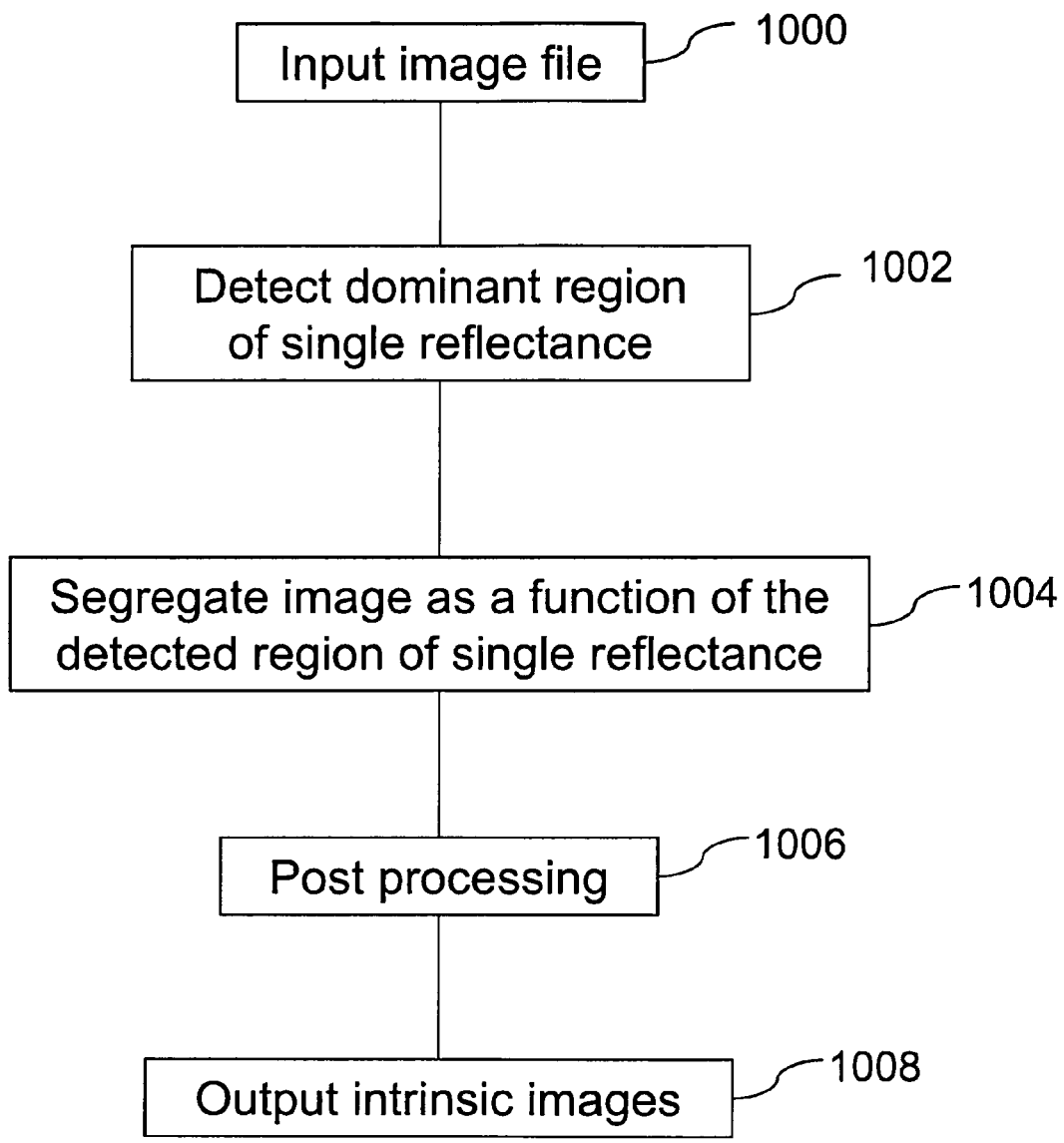
FIG. 3 is a flow chart for performing an operation to generate intrinsic images, using a single reflectance technique, according to a feature of the present invention.

Images depicted in some image files 18 are dominated by a single material, for example, a lawn in a sports playing field, or skin in a human face. In such a case, the present invention utilizes the fact of the dominance of a single reflectance region of an image, to improve computer operations relevant to the generation of intrinsic images. To that end, FIG. 3 shows a flow chart for performing an operation to generate intrinsic images, using a single reflectance technique, according to a feature of the present invention.

In step 1000 a selected image file 18 is input to the CPU 12. In step 1002, the CPU 12 executes a routine to detect a dominant image region of a single reflectance. According to a feature of the present invention, any one of several different methods can be implemented to detect the region of single reflectance. For example, step 1002 can be implemented via alternative methods, such as, for example, a log chromaticity clustering method, a large token analysis, a pixel stability analysis or a spectral analysis, as will appear.

In step 1004, the CPU 12 segregates the image as a function of the detected dominant, single reflectance region of the image depicted in the input image file 18. The segregation can be performed by the CPU 12 through execution of any one of several techniques, for example, a constraint/solver model, or a computation based upon pixels of the detected region of single reflectance. In step 1006, the CPU 12 performs post processing, such as, for example, a factoring of the illumination to provide an image illuminated by diffuse illumination, then outputs intrinsic images corresponding to the image of the input image file 18 (step 1008).

In the performance of step 1002 using log chromaticity clustering, the CPU 12 computes an illumination-invariant log chromaticity value for each pixel of the input image file 18. Log chromaticity is a technique for developing a two dimensional illumination invariant chromaticity space. A method and system for separating illumination and reflectance using a log chromaticity space is disclosed in U.S. Pat. No. 7,596,266, which is hereby expressly incorporated by reference. The techniques taught in U.S. Pat. No. 7,596,266 can be used to provide illumination invariant log chromaticity representation values for each pixel of an image.

Logarithmic values of the color band values of the image pixels are plotted on a log-color space graph. The logarithmic values are then projected to a log-chromaticity projection plane oriented as a function of a bi-illuminant dichromatic reflection model (BIDR model), to provide a log chromaticity value for each pixel, as taught in U.S. Pat. No. 7,596,266. The BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image.

Figure 4:
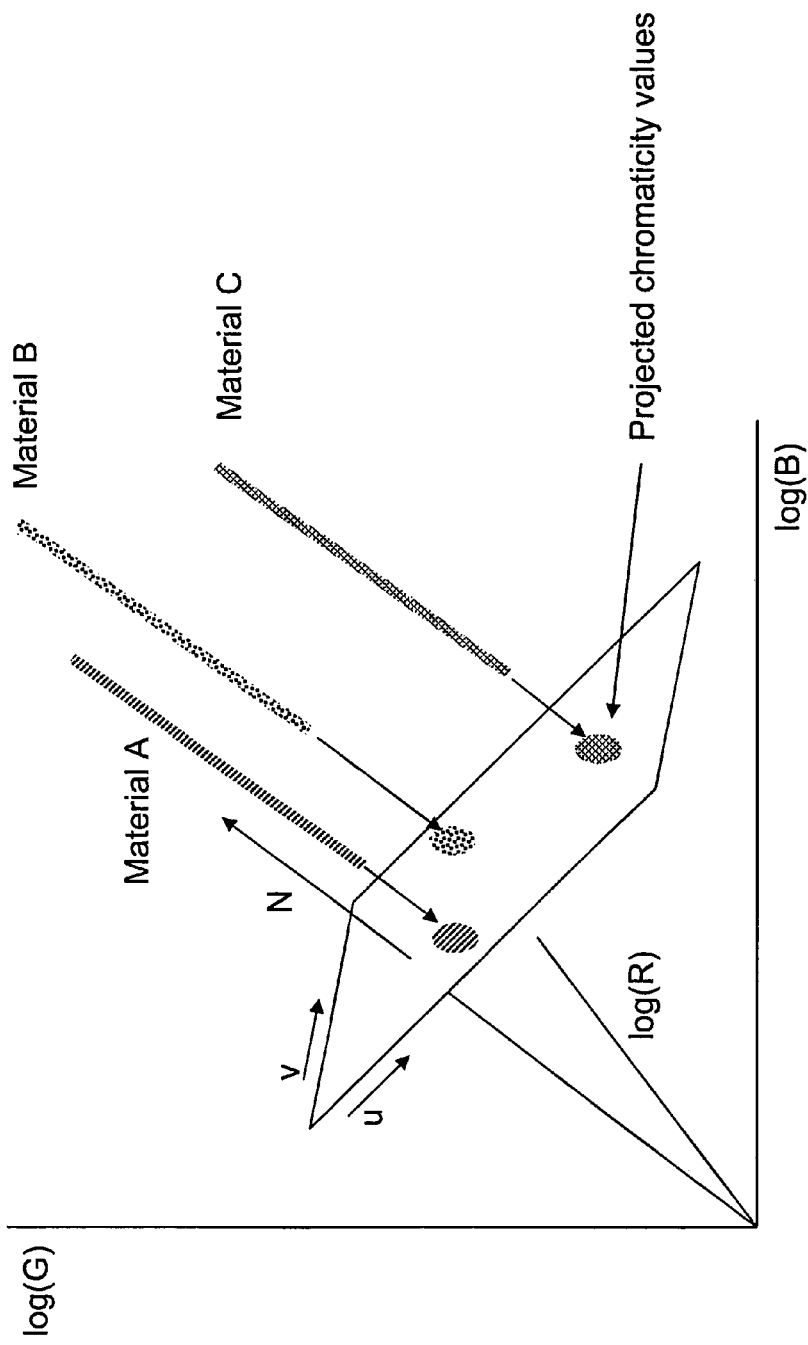
FIG. 4 is a graphic representation of a log color space chromaticity plane according to a feature of the present invention.

FIG. 4 is a graphic representation of a log color space, bi-illuminant chromaticity plane according to a feature of the invention disclosed in U.S. Pat. No. 7,596,266. The alignment of the chromaticity plane is determined by the vector N, normal to the chromaticity plane, and defined as N=log (Bright$_{vector}$)−log(Dark$_{vector}$)=log(1+1/S$_{vector}$). The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 4.

Thus, the RGB values of each pixel in an image file 18 can be mapped by the CPU 12 from the image file value p(n, m, R, G, B) to a log value, then, through a projection to the chromaticity plane, to the corresponding u, v value, as shown in FIG. 4. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

Accordingly, all of the pixels of the input image file 18 representing the dominant region of single reflectance, for example, pixels corresponding to skin in an image depicting a human face, will have a similar log chromaticity value (within the noise level of the device used to record the image, for example, the camera 14), and be within a single cluster. The CPU 12 can implement any known clustering algorithm, to cluster pixel log chromaticity values. Pixels representing regions of the image other than the skin, for example, eyebrows, lips, the iris of the eye, and so on, will fall outside the single cluster corresponding to skin pixels. Thus, all pixels within the single large cluster will be designated as being in the dominant region of single reflectance.

In the performance of step 1002 using the alternative large token analysis, the CPU 12 initially computes Type C tokens.

Figure 5:
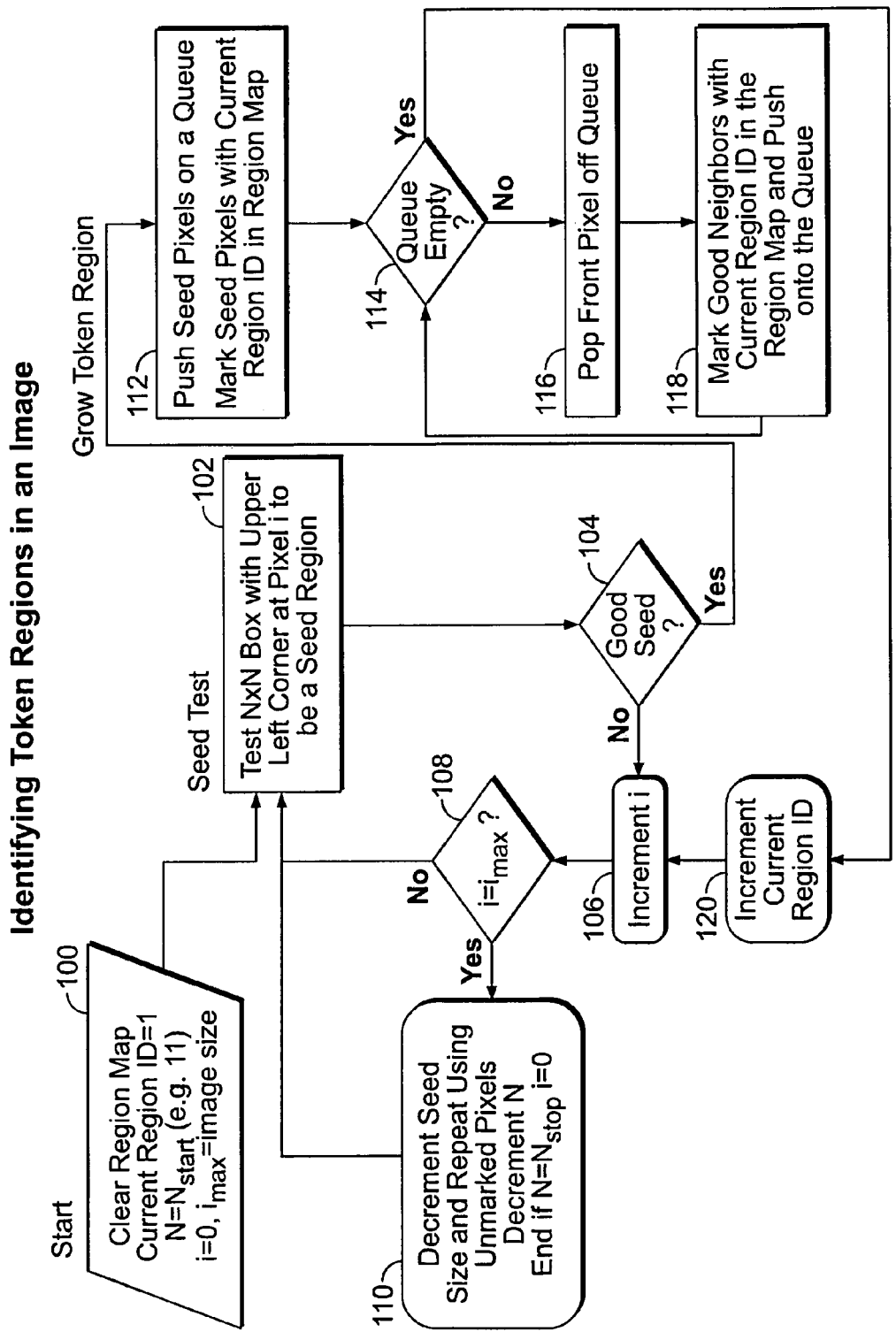
FIG. 5 is a flow chart for identifying Type C token regions in the image file of FIG. 2a, according to a feature of the present invention.

Referring now to FIG. 5, there is shown a flow chart for a tokenization method for generating Type C token regions, according to a feature of the present invention. A $1^{st}$ order uniform, homogeneous Type C token comprises a single robust color measurement among contiguous pixels of the image. At the start of the identification routine of FIG. 5, the CPU 12 sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=N$_{start}$. N$_{start}$ can be any integer >0, for example it can be set at set at 11 or 15 pixels.

At step 102, a seed test is begun. The CPU 12 selects a first pixel, i=1, pixel(1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel.

If the comparison does not result in approximately equal values (for example, within the noise levels of the recording device for RGB values) for the pixels in the seed, the CPU 12 increments the value of i(step 106), for example, i=2, pixel (1, 2), for a next N×N seed sample, and then tests to determine if i=i$_{max}$ (decision block 108).

If the pixel value is at i$_{max}$, a value selected as a threshold for deciding to reduce the seed size for improved results, the seed size, N, is reduced (step 110), for example, from N=15 to N=12. In an exemplary embodiment of the present invention, i$_{max}$ can be set at a number of pixels in an image ending at pixel (n, m), as shown in FIG. 2. In this manner, the routine of FIG. 5 parses the entire image at a first value of N before repeating the routine for a reduced value of N.

After reduction of the seed size, the routine returns to step 102, and continues to test for token seeds. An N$_{stop}$ value (for example, N=2) is also checked in step 110 to determine if the analysis is complete. If the value of N is at N$_{stop}$, the CPU 12 has completed a survey of the image pixel arrays and exits the routine.

If the value of i is less than i$_{max}$, and N is greater than N$_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token. In the event the pixels comprise intensity histogram representations, the token can be marked as Type C$_T$.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 6A:
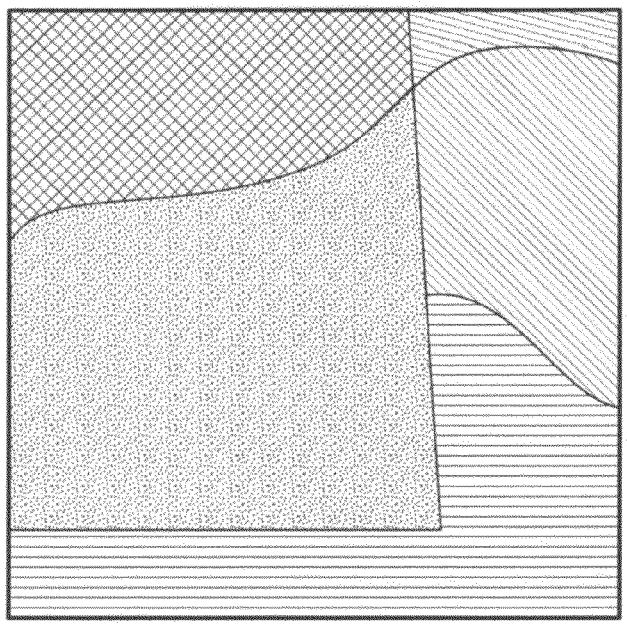
FIG. 6a is an original image used as an example in the identification of Type C tokens.
Figure 6B:
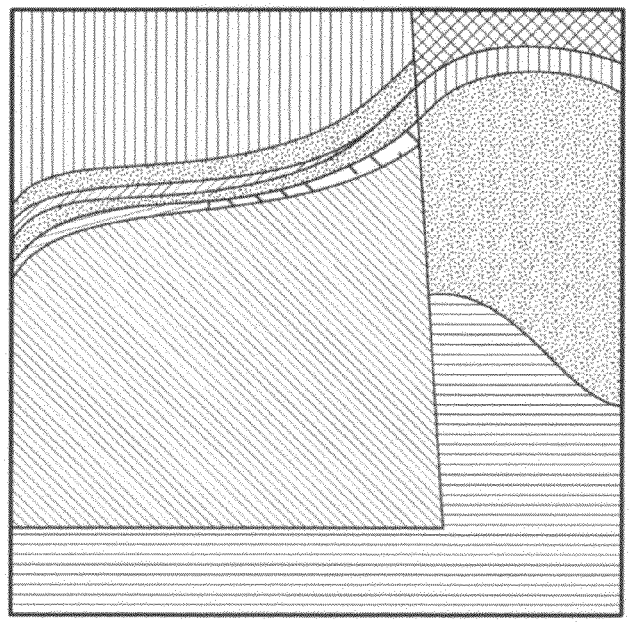

Upon arrival at $N=N_{stop}$, step 110 of the flow chart of FIG. 5, or completion of a region map that coincides with the image, the routine will have completed the token building task. FIG. 6a is an original image used as an example in the identification of tokens. The image shows areas of the color blue and the blue in shadow, and of the color teal and the teal in shadow. FIG. 6b shows token regions corresponding to the region map, for example, as identified through execution of the routine of FIG. 5 (Type C tokens), in respect to the image of FIG. 6a. The token regions are color coded to illustrate the token makeup of the image of FIG. 6a, including penumbra regions between the full color blue and teal areas of the image and the shadow of the colored areas.

In the token size analysis implementation of step 1002, upon the identification of Type C tokens in the selected input image file 18, the CPU 12 performs an analysis of the identified Type C tokens. Type C tokens that include, for example, skin pixels will be large relative to tokens corresponding to pixels representing other features of the face, for example, eyebrows, lips, the iris of the eye, and so on. Thus, a threshold value for a number of pixels in a token can be set so as to be able to identify relatively large tokens, and thereby establish the region of a dominant, single reflectance. For example, the threshold size can be set as a function of the interocular distance (the distance between the eyes), such as: threshold= (interocular distance in pixels)/7.

In the performance of step 1002 using stability analysis, the CPU 12 operates to characterize the stability of pixels in an input image file 18 and defines a dominant region of single reflectance as a function of the pixel stability measurements. For example, the pixels of identified Type C tokens can be analyzed as to stability, the tokens included in the dominant region if the constituent pixels are stable. In a stability analysis, focus is placed upon how similar a subject pixel is to neighboring pixels. Pixels in a dominant region of an image will be similar to a large number of neighboring pixels. Stability can be measured using several different methods.

For example, second derivative energy can be used to indicate the stability of pixels of an image. In this approach, the CPU 12 calculates a second derivative at each pixel, or a subset of pixels disbursed across the image to cover all illumination conditions of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. The sigma of the gaussian (defining the size of the second derivative filter) is adjusted to interocular distance when the subject image depicts a face.

Upon the calculation of the second derivative energy for each of the pixels, the CPU 12 analyzes the energy values of the pixels. There is an inverse relationship between second derivative energy and pixel stability, the higher the energy, the less stable the corresponding pixel. In an image having a dominant region of single reflectance, all of the pixels in the dominant region will have a similar low second derivative energy. The CPU 12 can identify all such pixels and thereby identify the dominant region of the image.

In a second method for measuring pixel stability, the CPU 12 utilizes a second derivative relative to a vertical direction. This is an approach based upon a recognition of the fact that certain features of the geometry of a face, for example, eyes, eyebrows, nostrils and lips, tend to be horizontally aligned features of a face. Thus, an image can be evaluated in the vertical direction by convolving an image horizontally with a 1-d gaussian filter of some sigma, and then vertically by a 1-d laplacian of gaussian filter. The sigma values used in each convolution process can be set based upon the interocular distance. The result provides second derivative energy information in the vertical direction, which can be used to detect horizontal stripes formed by eyes, eyebrows and lips, while ignoring vertical features such as vertical shadow boundaries. The second derivative energy in the vertical direction can be converted to a single value per pixel, for a stability analysis similar to the second derivative energy method described above.

According to a third method, the CPU 12 applies a bilateral filter to the image. A bilateral filter is an edge preserving blurring filter. The filter changes each pixel value to a weighted average of pixels surrounding a subject pixel. The weights in the weighted average correspond to how similar the surrounding pixels are to the subject pixel both in terms of spectral properties and spatial properties. Thus, a nearby pixel of similar color will have a high weight, while a distant pixel of dissimilar color will have a low weight.

While the weighted average is the typically used output of a known bilateral filter, according to a feature of the present invention, the sum of the weights that go into the weighted average is used to measure pixel stability. The higher the weight, the more similar a pixel is to more of nearby neighbors, and thus, the more stable it is. Each pixel in a dominant region of single reflectance will have a sum of weights for the surrounding pixels which is higher than the pixels representing other areas of the image. The size of the bilateral filter and the threshold for the sum of weights can be adjusted according to the interocular distance. As in the previous methods, this factor is evaluated by the CPU 12 to identify the dominant region in the image.

Stability of pixels can also be evaluated relative to local variance in pixel values. The CPU 12 calculates and evaluates the variance in red, green and blue values in a region surrounding each pixel (or variance in the single value for a grayscale image). The size of the region can be based upon interocular distance in an image depicting a face. The higher the variance, the less stable the pixel. Thus, the evaluation can be based upon the inverse relationship between stability and variance to identify a dominant region.

Each of the above methods for detecting pixel stability produces a value corresponding to the stability of each pixel. The stability values can be used to detect a dominant region by placing a threshold on the values at a preselected value determined empirically: for instance, all pixels which have a sufficiently low variance can be considered stable. The pixel stabilities can be optionally blurred prior to thresholding. Additionally, the resulting region after thresholding can be optionally eroded to remove isolated points and/or dilated to fill in holes.

According to a further exemplary embodiment of the present invention, the performance of step 1002 can be implemented using a spectral analysis. For example, if it is known or expected that the dominant region is a particular color, for example, green for grass in the playing filed of a stadium, then all pixels that are sufficiently similar to the expected color of the dominant region are placed in the region.

Once a dominant region of single reflectance is identified (step 1002), the CPU 12 proceeds to step 1004 to segregate the image into illumination and material aspects of the image. If, for example, the log chromaticity method was implemented to identify the region of single reflectance, the CPU 12 can identify the illumination aspects of the image via the relationship of I=ML, or I=RL, wherein I is the intensity of an image reflectance and L the illumination value. In the situation of an image with a single dominant region of same reflectance, the CPU 12 can assume any color for all of the pixels within the single large region identified by the CPU 12, for example, a flesh tone, and then solve the I=ML equation for the illumination value of each pixel, using the assumed material color and the recorded value for I, for each pixel of the single dominant region. The result is an illumination map corresponding to the pixels of the dominant region of single reflectance.

Any known in-filling or in-painting technique can be used to expand the illumination found for the dominant region of single reflectance, to pixels representing other areas of the image, for example, the eyes of an image depicting a human face. For example, a thin plate spline can be fit to the calculated illumination values and used to project the values for the illumination in other areas. For a more detailed description of in-filling or in-painting techniques, reference is made to "Inpainting and the Fundamental Problem of Image Processing" by Jianhong (Jackie) Shen, SIAM News, Volume 36, Number 5, June 2003.

Alternatively, a constraint/solver model can be implemented to segregate the image (step 1004), for example, when, a tokenization was performed to identify the dominant region of single reflectance. All of the Type C tokens identified as being in the region of single reflectance are constrained in a matrix equation, to be of a same material. All adjacent Type C tokens of the image of the image file 18 are also constrained in a matrix equation to be in a smooth-illumination constraint. A smooth-illumination constraint can be used to determine the illumination in regions of the image including regions of the image that are outside the dominant region. In a smooth-illumination constraint, the constraint is based upon the average illumination of the pixels near a shared boundary between adjacent Type C tokens. This constrains the illumination field to be somewhat smooth, as opposed to piecewise constant throughout a token.

According to a feature of the present invention, the constraint/solver model can be utilized to segregate illumination and material in an image other than one wherein a dominant region of single reflectance is present. Generally, a same material constraint, as taught, for example, in U.S. Patent Publication No. US 2010/0142825, utilizes Type C tokens and identified regions of uniform reflectance, such as the dominant region of single reflectance. The dominant region of single reflectance comprises a Type B token. The constraining relationship of a same material constraint is that all Type C tokens that are part of the same Type B token are constrained to be of the same material.

As taught in U.S. Patent Publication No. US 2010/0142825, the same material constraint enforces the definition of a Type B token, that is, a connected image region comprising contiguous pixels that represent a region of the image encompassing a single material in the scene (uniform reflectance), though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Figure 7:
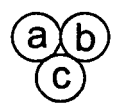
FIG. 7 is a representation of an [A] [x]=[b] matrix relationship used to identify and separate illumination and material aspects of an image, according to a same-material constraint feature of the present invention.

FIG. 7 is a representation of an [A][x]=[b] matrix relationship used to identify and separate illumination and material aspects of an image, according to a same-material constraint feature of the present invention. Based upon the previously discussed I=ML equation, log(I)=log(ML)=log(M)+log(L). This can be restated as i=m+l, wherein i represents log(I), m represents log(M) and l represents log(L). In the constraining relationship of a same material, in an example where three Type C tokens, a, b and c, (as shown in FIG. 7) are within a region of single reflectance (Type B token), as determined, for example, by the token size analysis, $m_a=m_b=m_c$. For the purpose of this example, the I value for each Type C token is the average color value for the recorded color values of the constituent pixels of the token.

Since: $m_a=i_a-l_a$, $m_b=i_b-l_b$, and $m_c=i_c-l_c$, these mathematical relationships can be expressed, in a same material constraint, as $(1)l_a+(-1)l_b+(0)l_c=(i_a-i_b)$, $(1)l_a+(0)l_b+(-1)l_c=(i_a-i_c)$ and $(0)l_a+(1)l_b+(-1)l_c=(i_b-i_c)$.

Thus, in the matrix equation of FIG. 7, the various values for the log(I) ($i_a$, $i_b$, $i_c$), in the [b] matrix, are known from the average recorded pixel color values for the constituent pixels of the adjacent Type C tokens a, b and c. The [A] matrix of 0's, 1's and −1's, is defined by the set of equations expressing the same material constraint, as described above. The number of rows in the [A] matrix, from top to bottom, corresponds to the number of actual constraints imposed on the tokens, in this case three, the same material constraint between the three adjacent Type C tokens a, b and c. The number of columns in the [A] matrix, from left to right, corresponds to the number of unknowns to be solved for, again, in this case, the three illumination values for the three tokens. Therefore, the values for the illumination components of each Type C token a, b and c, in the [x] matrix, can be solved for in the matrix equation. It should be noted that each value is either a vector of three values corresponding to the color bands (such as red, green, and blue) of our example or can be a single value, such as in a grayscale image.

According to a feature of the present invention, the smooth-illumination constraint can be implemented as a Laplacian-smooth illumination constraint. In a Laplacian-smooth illumination constraint, the concept of smooth is defined in a manner such that an illumination image has a local response to a Laplacian filter that is zero. The Laplacian is computed from the sum of the second derivatives in the x and y directions, as follows:

$$\nabla^2 f(x,y)=\partial^2 f(x,y)/\partial x^2+\partial^2 f(x,y)/\partial y^2 \qquad (1)$$

The Laplacian constraint, $\nabla^2 f(x, y)=0$, is met when the local variation of the two dimensional function $f(x, y)$ is planar, since the second derivative of a plane is zero.

In the image formulation model of I=RL, the log domain is once again used such that i=r+l (where x≈log (X) for x∈{i, r, l}) Thus, the zero-Laplacian constraint is applied to the log-illumination image, as follows:

$$\nabla^2 l=0 \qquad (2)$$

$$\nabla^2 (i-r)=0 \qquad (3)$$

$$\nabla^2 r=\nabla^2 i \qquad (4)$$

where the unknowns are the log-reflectance values r, and the right hand side is computed from known, observed log-image data for i, as for example the recorded values stored in an image file 18.

Approximating the second derivative to represent $\nabla^2 f(x, y)$ with discrete centered differences provides the following common Laplacian filtering kernel:

$$\begin{bmatrix} 0 & 1 & 0 \\ 1 & -4 & 1 \\ 0 & 1 & 0 \end{bmatrix} \quad (5)$$

Convolving the above filtering kernel with $f(x, y)$ computes $f(x, y-1)+f(x, y+1)+f(x-1, y)+f(x+1, y)-4f(x, y)$ at each pixel $p(n, m)$ wherein the n, m values are represented by x, y coordinates. Thus, according to the relationship (4), set forth above, a linear system of constraints can be developed on the unknown value r by applying the filtering kernel of (5) to the log-image data to generate a right-hand side of the linear system of constraints and building a left-hand matrix enforcing the same linear filtering relationship on the unknown values, as follows:

$$\underbrace{\begin{bmatrix} \ldots & 0 & 1 & 1 & -4 & 1 & 1 & 0 & \ldots \\ & & & & \vdots & & & & \end{bmatrix}}_{A} \begin{bmatrix} \vdots \\ r(x, y-1) \\ r(x-1, y) \\ r(x, y) \\ r(x+1, y) \\ r(x, y+1) \\ \vdots \end{bmatrix} = \begin{bmatrix} \vdots \\ \nabla^2 i(x, y-1) \\ \nabla^2 i(x-1, y) \\ \nabla^2 i(x, y) \\ \nabla^2 i(x+1, y) \\ \nabla^2 i(x, y+1) \\ \vdots \end{bmatrix} \quad (6)$$

$$Ar = \nabla^2 i \quad (7)$$

The sparse, band-diagonal constraint matrix A has as many rows and columns as there are pixels in the image. The number of non-zero elements will be equal to fiver times the number of pixels.

According to another feature of the present invention, a Laplacian-of Gaussian filtering strategy can be implemented for additional smoothing and/or noise reduction. In such a case, the Laplacian filtering kernel (representation (5), above) is convolved with a two dimensional Gaussian kernel to incorporate information from a larger neighborhood around each pixel. This yields more non-zero entries in A.

For multi-band imagery, such as the RGB data of our example, the constraints represented by (6) and (7) above, are applied independently to each band $i^{(k)}(x, y)$ where, for example, $k \in \{0, 1, 2, \ldots\}$ or $k \in \{R, G, B\}$. In a multi-band image, the right hand side of (7) will have as many columns as there are bands in the multi-band image, for example, three columns in an RGB image. Correspondingly, the solution r will have the same number of columns. The structure and elements of the constraint matrix A remains the same for all bands.

It should also be noted that while the above described Laplacian-smooth illumination constraint was described relative to image pixels, the constraint can be implemented at the Type C token level. In such a case, the filtering kernel entries on each row of A are accumulated for each token in an image of an input image file 18, to provide a new matrix A'. The matrix A' has as many rows as there are pixels in the image, but only as many columns as there are Type C tokens in the image. The number of tokens will be far fewer than the number of pixels to thereby improve the computational efficiency of CPU 12 operation. The matrix A' is represented as follows:

$$A'[i, j] = \sum_{k \in T_j} A[i, k], \quad (8)$$

where i represents the linear index of pixel $(x_i, y_i)$ and $T_j$ represents the set of pixels in token j.

In practice, tokens may contain blend pixels. Blend pixels are pixels between two differently colored regions of an image. If the colors between the two regions are plotted in RGB space, there is a linear transition between the colors, with each blend pixel, moving from one region to the next, being a weighted average of the colors of the two regions. Thus, each blend pixel does not represent a true color of the scene depicted in the image, and can cause artifacts in the results of an image process. In such cases, when tokens include blend pixels, there may be a discrepancy in the constraint relationship represented by (7) between the right-hand side filter responses $\nabla^2 i$ computed on the original image data and the left-hand side constraints encoded in the structure A'. If the illumination l is computed as the residual i–r, the result may include unwanted color artifacts in the computed illumination image.

According to a feature of the present invention, the unwanted color artifact effect is mitigated by implementing modifications to the image file 18 before a Laplacian filtering step, and using the modified image for the right-hand side of (7). One modification includes the step of replacing each pixel in the log-image i by the average image value of the token to which each respective pixel is a constituent pixel, as follows:

$$i'(x, y) \leftarrow \frac{1}{|T_{(x,y)}|} \sum_{k \in T_{(x,y)}} i(x_k, y_k) \quad (9)$$

FIGS. 8a-d illustrate another modification to an input image file 18 to mitigate an unwanted color artifact effect. FIGS. 8a-d illustrate a sequence of representations of a Type C token, showing a modification of the Type C token to model the token based upon a token trend prediction, according to a feature of the present invention. In the token trend prediction technique, each Type C token in an image file 18 is modeled in a manner to eliminate any possible blend pixels among the constituent pixels of the respective Type C token.

Figure 8A:
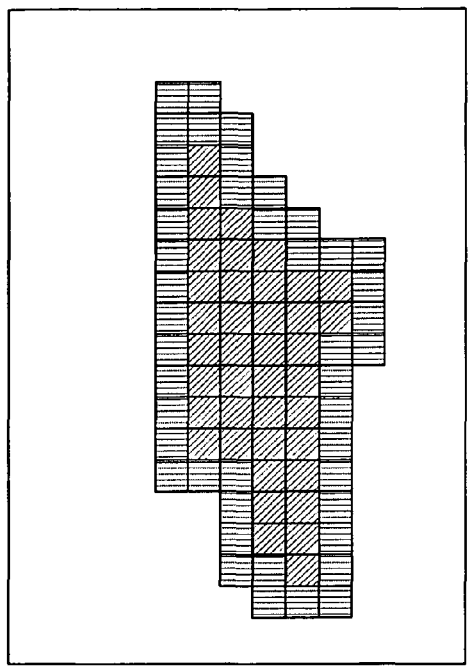
FIGS. 8a-d illustrate a sequence of representations of a Type C token, showing a modification of the Type C token to model the token based upon a token trend prediction, according to a smooth-illumination constraint feature of the present invention.
Figure 8B:
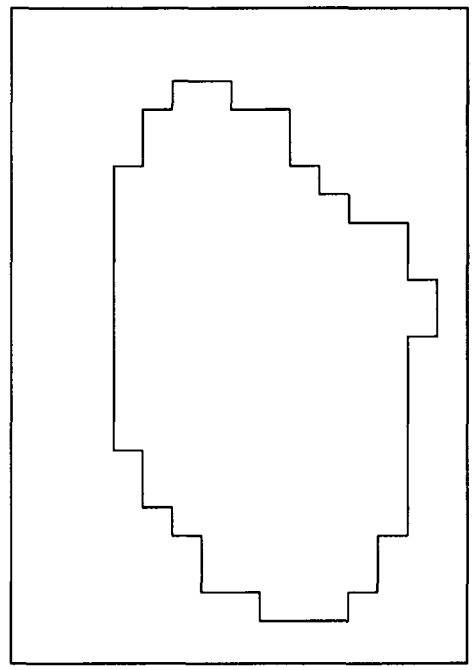

FIG. 8a shows a Type C token. In FIG. 8b, the constituent pixels of the Type C token are shown, with the perimeter pixels shaded. Any blend pixels present in the Type C token will most likely be found around the perimeter region of the token. According to the token trend prediction feature of the present invention, a function such as, for example, a thin-plate spline, is used to model or predict trends for interior pixels toward the perimeter of the token. Other functions that can be implemented to predict pixel trends include non-uniform rational b-splines, plane predictions, polynomial surfaces, and so on.

Figure 8C:
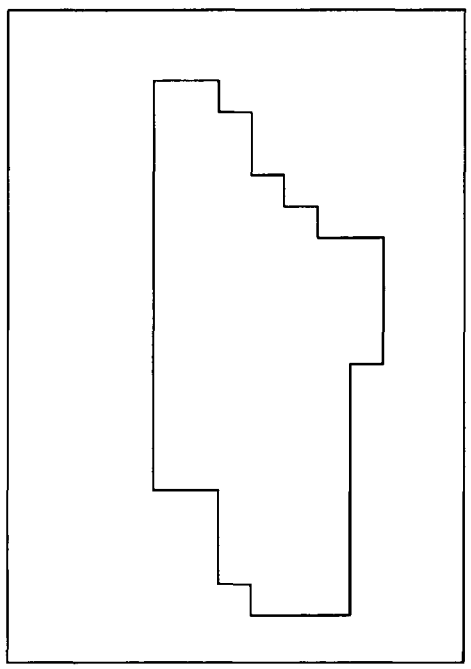

As shown in FIG. 8c, overlapping 5x5 pixel boxes are sampled around the perimeter of the token. Given a maximum distance for predicting pixels, a window can be drawn around the perimeter of the token being analyzed for filling out with predicted pixels (replacing the perimeter pixels), using the 5x5 pixel array samples. For each sample, the perimeter pixels are ignored, and, in an exemplary embodiment of the present invention, a thin-plate spline is used to model each of the red, green and blue color values for the remaining interior pixels of the sample. First, however, the number of remaining interior pixels are counted to determine if there are enough pixels to fit a thin-plate spline. If there are a sufficient number of pixels for a thin-plate spline, a thin-plate spline is fit to the respective 5×5 array. For each pixel to be modeled based upon the thin-plate spline (for example, up to three pixels away from a control, point), if the predicted the value is closer to a control point, then the value is specified by the thin-plate spline.

Next, a distance transform is performed on the interior pixels. For every distance of 1 or less for which there is no model based upon a thin-plate spline, the pixel value in the window is specified by the value of the pixel that lead to the low distance. Thus, any interior pixels for which there was not a thin-plate spline, are modeled by themselves, and any perimeter pixels adjacent to an interior pixel is modeled by the interior pixel. Finally, the values of perimeter pixels are projected out one pixel, such that any pixel within one pixel of the token is modeled by the nearest token pixel and any pixel on the perimeter of the token that is not neat a thin-plate spline or an interior pixel is modeled by itself.

Figure 8D:
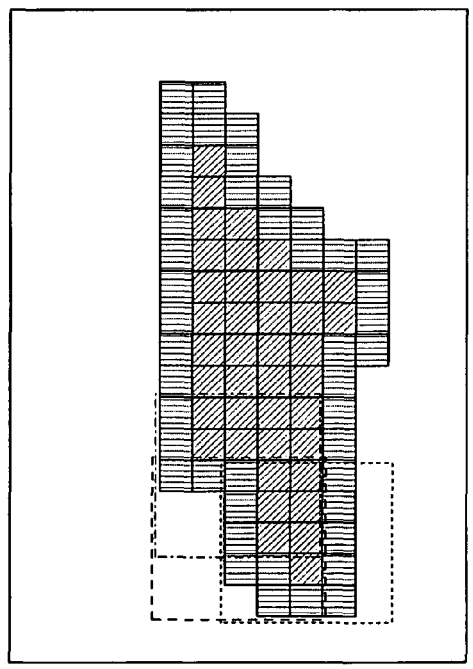

Moreover, if a token has eight or fewer pixels it cannot have interior pixels. Accordingly, in such cases, the modeling process is not performed. Instead, the CPU 12 executes a code for querying a model value to loop through the eight or fewer pixels of the respective token, looking for a pixel spatially closest to the pixel to be modeled, returning that value for the pixels of the token. FIG. 8d shows a token reconfigured as per the modeling techniques of the present invention, wherein all of the pixels of the token, and at least one pixel beyond the token boundary are set to a model value.

According to another feature of the present invention, when solving for an optimal reflectance r according to the above described constraints, the constraints can be individually weighted to emphasize or de-emphasize each constraint, as desired by a user. The weights assigned to various constraints can be specified both relative to each other and relative to constraints from other sources, for example, constraints in a same material constraint matrix are weighted relative to one another, or same material constraints are weighted relative to smooth illumination constraints, and so on. In general, Laplacian-smooth illumination constraints are assigned much less weight, relative to other constraint types (by an order of magnitude or two).

In addition, other sources of information are used to weight individual smooth-illumination constraints relative to one another. For example, when there is knowledge of depth discontinuities or occlusions, from a source such as stereo information or user input, there is no reason to enforce a smooth-illumination constraint because at a depth discontinuity it is probable that spatially-separated surfaces are lit by different illumination conditions. Thus, the constraints (i.e. rows in A) corresponding to the pixels of an image located at the discontinuity can be down-weighted substantially or possibly removed entirely.

Another possibility, according to this feature of the present invention, is to down weight the constraints as a function of a filter response. For example, the magnitude of the actual filter response, $|\nabla^2 i(x, y)|$, can be used to weight the constraint at pixel (x, y). Since the Laplacian filter responds more strongly at sharp boundaries, and the underlying assumption is that illumination transitions are smooth, constraints at pixels with stronger filter responses are subject to a down-weight adjustment. A weighting scheme in such cases can be implemented as the simple inverse of the filter response, as follows: $w(x, y)=1/|\nabla^2 i(x, y)|$, or alternatively, one over the square of the Laplacian, one over the square root of the Laplacian or one over the magnitude of the gradient at the image location.

According to yet another feature of the present invention, smooth-illumination constraint chains that are impossible under reasonable illumination conditions are detected and broken. Smooth-illumination constraints can be implemented between adjacent Type C tokens. Thus, in an example of tokens a, b and c, there is a constraint between tokens a and b, and also between tokens b an c, and so on, to form a chain of constraint relationships.

Smooth-illumination constraint chains can cause unwanted color artifact effects in the generation of intrinsic images. A usual reason is because a Type C token representing a lit foreground object borders a Type C token representing a shadowed background (or vice versa). Such a circumstance can be so problematical that the foreground is brightened in an intrinsic image beyond what is reasonable. According to a feature of the present invention, a chain of tokens causing an unwanted color artifact can be detected by searching the chain as a function of certain observable image characteristics, even without depth information, or user input.

For example, for each Type C token identified in an image, an estimate can be made of the lower bound for the brightness of the material color of the respective token. If a Type C token is part of a Type B token, then the material color brightness for the token must be at least as bright as the brightest part of the respective Type B token in the original image. If the Type C token is not part of an identified Type B token, then it must be at least as bright as the respective token appears in the original image. Either of those values provides a basis for an estimate of a lower bound for maximum brightness of a token. Moreover, due to the constraint between tokens a and b, and the constraint between tokens b and c, an analysis can be made relative to a reasonable relationship between tokens a and c.

According to a feature of the present invention, the image characteristics of a lower bound for material brightness, and a reasonable relationship between tokens a and c, are used to determine whether a chain is reasonable. A Type C token is selected, and the minimum brightness for the selected token is estimated (one of the brightest part of a Type B token to which the selected token belongs, or the brightness of the Type C token in the original image). Next, results for smooth-illumination constraints along a chain of tokens from the selected token, are determined.

If the resulting brightness according to the chain of constraints is significantly higher than the brightest value possible for a token in the chain, for example, 1.5 times an estimated brightness for the token, the chain is unreasonable. Generally, if at any point in the execution of a smooth-illumination constraint, a predicted value for a token is more than 1.5 times the brightest value in the original image, the constraint is impossible. The weight for each constraint marked as impossible is significantly weakened when solving for optimum values for an intrinsic image, as will be described. Each impossible constraint is weakened rather than removed to maintain continuity in the analysis.

Additionally, a check is made as to how much darker a last token in a chain is than the first token of the chain. If the last token is more than 40 times darker than the first token, that is another indication that the chain is unreasonable. This is based upon knowledge that material variation is always less than 40:1. The last constraint of that chain is also marked as an impossible constraint.

A standard least squares solver can be executed by the CPU 12 to solve for optimized values for the unknowns in the matrix equations of FIG. 7 and the representations (6) and (7) (or (8)), set forth above, to generate intrinsic images. Typically, the optimal solution determined by the solver is one of material (reflectance) or illumination. The recorded pixel values for the input image file 18 are replaced by the optimal solution values, to generate a material or illumination image, as the case may be. The relationship I=ML can be used to calculate the other of a material or illumination image. The intrinsic material and illumination images can be used to enhance the accuracy and efficiency of image processing, image analysis and computer vision applications.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
   providing an image file depicting an image, in a computer memory;
   organizing information relevant to the image according to a smooth-illumination constraint enforcing a Laplacian filter response such that $\nabla^2 f(x, y)=0$; and
   utilizing the smooth-illumination constraint to generate an intrinsic image from the image,
   wherein the organizing includes applying the Laplacian filter response, $\nabla^2 f(x, y)=0$, to a log-illumination image,
   wherein the organizing includes approximating second derivatives in the x and y directions to represent $\nabla^2 f(x, y)$ with discrete centered differences to provide a Laplacian filtering kernel, wherein the organizing includes convolving the Laplacian filtering kernel with $f(x, y)$ to develop a linear system of constraints,
   wherein the linear system of constraints is developed by applying the Laplacian filtering kernel to log-image data to generate a right-hand side of the linear system of constraints and building a left-hand matrix enforcing the same linear filtering relationship on unknown values.

2. The method of claim 1 wherein the information relevant to the image comprises pixels.

3. The method of claim 1 wherein the information relevant to the image comprises tokens.

4. The method of claim 1 wherein the intrinsic image comprises a material image.

5. The method of claim 1 wherein the intrinsic image comprises an illumination image.

6. The method as recited in claim 1 further comprising identifying regions of a single material reflectance.

7. The method as recited in claim 6 wherein the step of organizing comprises using the smooth-illumination constraint to constrain adjacent single material reflectance regions.

8. The method as recited in claim 1 wherein the Laplacian filter response is computed from the sum of the second derivatives in the x and y directions, as follows:

$$\nabla^2 f(x,y) \partial^2 f(x,y)/\partial x^2 + \partial^2 f(x,y)/\partial y^2.$$

9. The method as recited in claim 1 wherein Laplacian filter response, $\nabla^2 f(x, y)=0$, is met when the local variation of the two dimensional function $f(x, y)$ is planar.

10. A computer system which comprises:
    a CPU; and
    a memory storing an image file containing an image;
    the CPU arranged and configured to execute a routine to organize information relevant to the image according to a smooth-illumination constraint enforcing a Laplacian filter response such that $\nabla^2 f(x, y)=0$ and utilize the smooth-illumination constraint to generate an intrinsic image from the image,
    wherein the organizing includes applying the Laplacian filter response, $\nabla^2 f(x, y)=0$, to a log-illumination image,
    wherein the organizing includes approximating second derivatives in the x and y directions to represent $\nabla^2 f(x, y)$ with discrete centered differences to provide a Laplacian filtering kernel, wherein the organizing includes convolving the Laplacian filtering kernel with $f(x, y)$ to develop a linear system of constraints,
    wherein the linear system of constraints is developed by applying the Laplacian filtering kernel to log-image data to generate a right-hand side of the linear system of constraints and building a left-hand matrix enforcing the same linear filtering relationship on unknown values.

11. A computer program product, disposed on a non-transitory computer readable media, the product including computer executable process steps operable to control a computer to: provide an image file depicting an image, in a computer memory, organize information relevant to the image according to a smooth-illumination constraint enforcing a Laplacian filter response such that $\nabla^2 f(x, y)=0$ and utilize the smooth-illumination constraint to generate an intrinsic image from the image,
    wherein the organizing includes applying the Laplacian filter response, $\nabla^2 f(x, y)=0$, to a log-illumination image,
    wherein the organizing includes approximating second derivatives in the x and y directions to represent $\nabla^2 f(x, y)$ with discrete centered differences to provide a Laplacian filtering kernel,
    wherein the organizing includes convolving the Laplacian filtering kernel with $f(x, y)$ to develop a linear system of constraints,
    wherein the linear system of constraints is developed by applying the Laplacian filtering kernel to log-image data to generate a right-hand side of the linear system of constraints and building a left-hand matrix enforcing the same linear filtering relationship on unknown values.

* * * * *